United States Patent [19]
Grenness

[11] 3,933,723
[45] Jan. 20, 1976

[54] SYNTHETIC RUBBER SOLUTIONS

[76] Inventor: Torbjorn Grenness, 24, Danas Plads, Copenhagen, Denmark

[22] Filed: Nov. 11, 1974

[21] Appl. No.: 522,727

Related U.S. Application Data

[63] Continuation of Ser. No. 376,583, July 5, 1973, abandoned.

[30] Foreign Application Priority Data

July 5, 1972 United Kingdom............... 31498/72

[52] U.S. Cl.....................260/33.6 A; 260/33.4 R; 260/33.6 AQ; 260/876 B; 427/430
[51] Int. Cl.²............................................ C08K 5/01
[58] Field of Search.. 260/33.4 R, 33.6 A, 33.6 AQ, 260/876 B

[56] References Cited
UNITED STATES PATENTS

| | | | |
|---|---|---|---|
| 3,239,478 | 5/1966 | Harlan ........................ | 260/33.6 AQ |
| 3,325,430 | 6/1967 | Grasley ................................. | 260/25 |
| 3,614,836 | 10/1971 | Snyder et al. ................ | 260/33.6 AQ |

OTHER PUBLICATIONS

Polymer Additives — Guidebook & Directory (Noyes Data Corp.) (Park Ridge, N. J.) p. 197.

Rubber World–Matls. & Cpdg. Ingredients for Rubber (Bill Pub.) (N. Y.) (1968), p. 56.

Cond. Chem. Dictionary (5th ed.) (Reinhold) (N. Y.) (1956), p. 513.

*Primary Examiner*—Donald E. Czaja
*Assistant Examiner*—H. H. Fletcher
*Attorney, Agent, or Firm*—Burgess Ryan and Wayne

[57] ABSTRACT

The invention relates to a solution for the production of rubber-like articles by dipping, said solution comprising an elastomer of the block-copolymer type extended with 5–100 percent by weight of an oil-extender, the oil-extended elastomer being dissolved in 200–1200 percent by weight of a solvent mainly consisting of aliphatic hydrocarbons.

The invention further relates to the production of said articles from said solvents, and to the produced articles.

2 Claims, 1 Drawing Figure

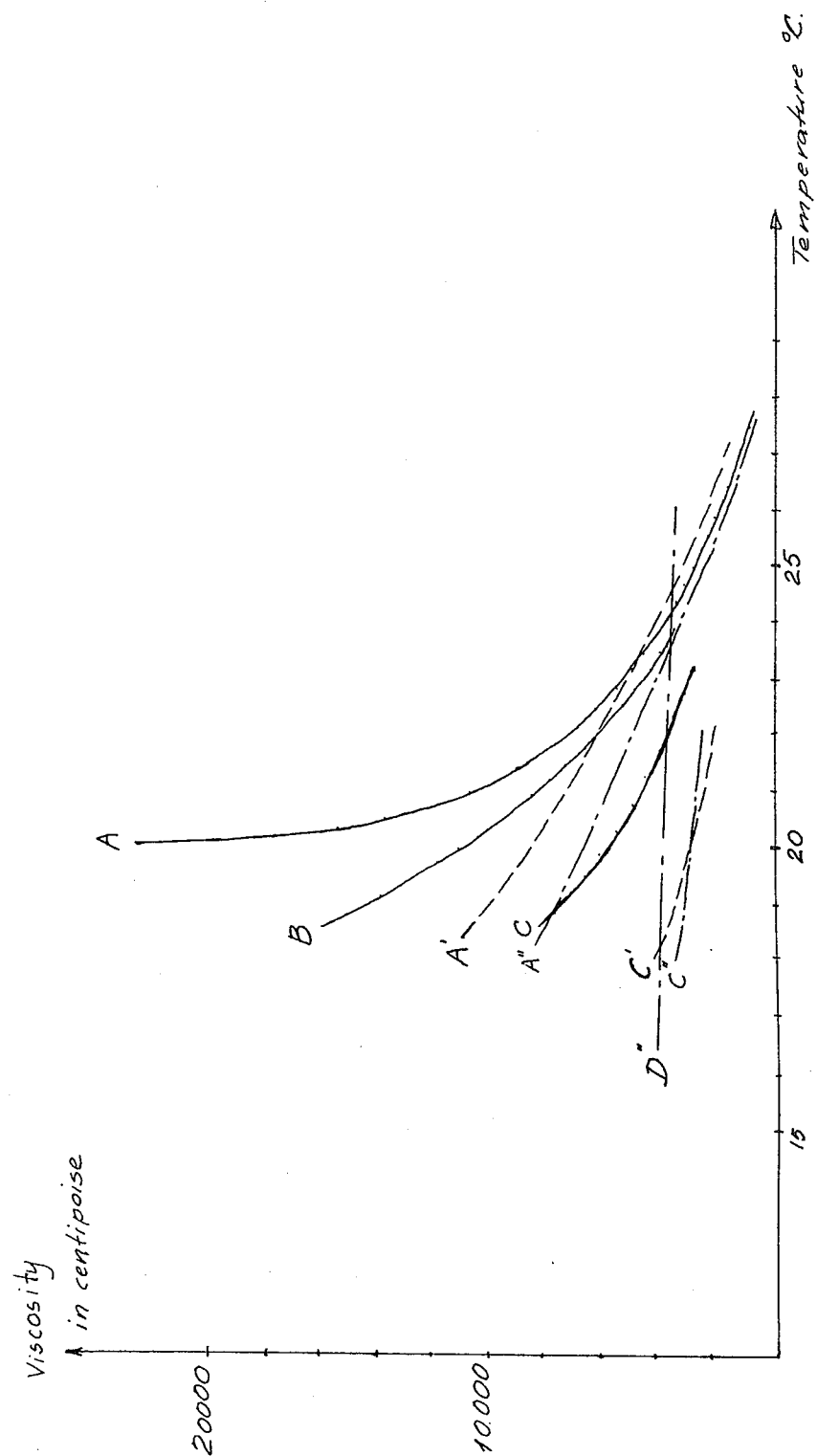

SYNTHETIC RUBBER SOLUTIONS

This application is a continuation of Applicant's copending application Ser. No. 376,583 filed July 5, 1973, and now abandoned.

This invention relates to novel solutions for the production of rubber articles by dipping, and to the production of such solutions.

Dipped rubber articles, such as rubber gloves, teats, nipples, and toy balloons, have for many years been produced from solutions of natural rubber in petrol, or from natural latex or latexlike emulsions of natural rubber, as well as from vulcanizable synthetic rubber solutions and emulsions.

In order to obtain the desired properties as regards strength, elasticity, recovery from stretching etcetera, the dipped articles have had to be subjected to a subsequent vulcanisation process, i.e. a cross-linking process. Originally, a cold vulcanisation was carried out by treating the dipped articles with chlorinated sulphur, but this cold vulcanisation was given up long ago in favour of hot vulcanisation, the vulcanizing agents and accelerators wholly or partly being added to the rubber mixture before dissolving the latter.

Since the vulcanisation step adds substantially to the manufacturing costs, the present invention aims at providing solutions preferably in aliphatic or mainly aliphatic hydrocarbons for producing articles of the said kind by dipping, in which production no vulcanisation is necessary.

With this object in view, a solution for producing rubber articles by dipping according to the present invention comprises an elastomer of the synthetic block copolymer type, which is made sufficiently soluble in aliphatic hydrocarbons by extension with from 5 to 100 percent by weight of a suitable oil-extender, the said oil-extended elastomer being dissolved in 200 to 1200 percent by weight of a solvent consisting or mainly consisting of aliphatic hydrocarbons.

Generally, the solutions of the invention also contain antioxidants, and they may contain the usual adjuvants, including waxes for ozone protection, pigments, and fillers.

At present, the preferred elastomer is a block-copolymer of the styrene-butadiene type, although other synthetic block-polymer types may be suitable, for instance a block-copolymer of the styrene-isoprene type.

More particularly, the preferred elastomers are of the kind of block-copolymers known as thermoplastic rubbers, which do not need vulcanisation, but nevertheless behave almost as vulcanized elastomers, exhibiting high resilience and elongation, combined with a low set at normal temperatures.

The use of mainly aliphatic hydrocarbons, as for example petrol, is decisively advantageous both for economic reasons and because their vapours are of low toxicity. Moreover, solvents of this kind are generally used in rubber factories for dissolving natural rubber and the non-oil resistant synthetic rubbers, which means that no change of solvent would be necessary in processing the present elastomers alternating with the processing of natural rubber or the said synthetic rubbers.

The oil extenders of the kind used in the manufacture of natural or synthetic rubber articles are not all equally well suited for use in the present solutions. The most widely used extenders for rubber are petroleum oils containing predominantly aliphatic, naphthenic, and aromatic hydrocarbons, and of these the naphthenic and the aromatic types are particularly suitable for use in the present solutions, because they cooperate with the aliphatic hydrocarbon solvent in dissolving the thermoplastic rubber and thus provide suitable concentrations of the latter for the dipping process. The preferred type is naphthenic process oil, because it is light coloured and — more important — has a moderate effect only on the strength of the deposited film.

It has furthermore been found that the said naphthenic process oil extenders improve the visco-elastic properties of the solutions to a surprising degree and reduce the shrinkage of the articles when solidifying on the dipping moulds, as well as reducing the tension in the deposited film. Accordingly, stripping of the articles from the moulds is easy.

Particularly good results have been obtained by using 15 to 35 percent of the naphthenic oil extender, calculated upon the synthetic rubber weight, both as to the visco-elastic properties and as to the strength and ageing stability of the deposited film.

A disadvantage of the present solutions, as compared with solutions of natural rubber or of the synthetic rubbers hitherto used, is that the viscosity of the former has an increased sensitivity to temperature variations at normal temperatures. This disadvantage can be overcome by strictly controlling the temperature of the solutions during the dipping. Thus, if the variations in the temperature of the solutions during the dipping are kept within 1°C, reasonably good results are obtained.

However, a manner of overcoming this disadvantage of increased temperature sensitivity has been found, which has proved surprisingly effective.

Thus, in a preferred embodiment of the present invention, the solutions also contain a small proportion of a dithiocarbamate, preferably zincdibutyldithiocarbamate, or an antioxydant, such as 1,3,5-trimethyl-2,4,6-tris(3,5-di-tert-butyl-4-hydroxybenzyl)-benzene, being soluble in aliphatic hydrocarbon solvents, for example 0.1–3.0 parts by weight per 100 parts by weight of thermoplastic rubber.

The use of dithiocarbamates as strong vulcanisation accelerators and as anti-oxyidants is well known in the rubber industry, but to my best knowledge no one before has noticed their extraordinary effect in stabilizing the viscosity of synthetic rubber solutions.

Only very few vulcanisation accelerators are soluble in aliphatic hydrocarbon solvents, but two other strong accelerators soluble in petrol, namely benzothiazolyl-2-diethylsulfenamide and a condensation product of acroleines with aromatic bases, have been tried.

As these chemicals show very little, if any, stabilizing effect on the viscosity of the solutions, I believe that the stabilizing effect is specific for the first mentioned soluble accelerators/antioxidants in the present solution of thermoplastic elastomers.

A further reduction of the viscosity of the present solutions can be obtained by admixing pure anhydrous ethanol or a technical grade of anhydrous ethanol, preferably in an amount of 5 to 10 percent by weight as calculated upon the amount of synthetic rubber in the solutions.

An example of a solution according to the present invention is as follows:

|                                           | Parts by weight |
|-------------------------------------------|-----------------|
| Thermoplastic styrene-butadiene copolymer | 100             |
| Naphthenic process oil (rubber process oil) | 20            |
| Zinc dibutyldithiocarbamate               | 0.5             |
| Extraction grade petrol (b.p. 100–130°C)  | 850             |

The viscosity of this solution as determined by means of the Brookfield viscometer with rotor No. 3 at 22°C ±1°C is about 4000 cp ±500 cp, corresponding to the viscosity of a natural rubber solution, which is well suited for producing dipped articles of rubber.

The accompanying drawing illustrates the effect of the addition of extender and of dithiocarbamate at different ratios between the thermoplastic copolymer and the solvent in the solutions of the invention.

The curves marked A represent a ratio of 1 part of the copolymer to 7.5 parts of solvent; that marked B represents a ratio of 1:8.5, and those marked C represent a ratio of 1:9.5, whereas that marked D represents a natural rubber solution in the ratio 1:8.5.

The fulldrawn curves represent solutions without added extender or dithiocarbamate. Curves drawn with broken lines represent solutions with added oil extender, and the dash-dotted curves represent solutions with admixed oil extender and dithiocarbamate.

It will be noted that addition of the oil extender and the dithiocarbamate both have a stabilizing effect on the viscosity as regards variations in temperature of the solutions.

Accordingly, the present invention also comprises a method of producing dipped articles from solutions of thermoplastic copolymers of the synthetic rubber type in aliphatic hydrocarbon solvents, in which a dipping solution is used, the sensitivity of which to temperature variations has been reduced by means of the addition of an oil extender and a vulcanisation accelerator, preferably zinc dibutyldithiocarbamate, and/or an anti-oxidant, preferably 1,3,5-trimethyl-2,4,6-tris(3,5-ditert-butyl-4-hydroxybenzyl)-benzene, being soluble in aliphatic hydrocarbon solvents.

I claim:

1. A solution for the production of rubber-like articles by dipping, comprising an elastomer of the block-copolymer type selected from the group consisting of styrene-butadiene copolymer and styrene-isoprene copolymer, chosen from the thermoplastic rubbers which do not need vulcanization, extended with 15 to 35% by weight of a naphthenic oil extender, the extended block-copolymer being dissolved in 200 to 1200% by weight of petrol, all of the percentages being per 100 parts of said elastomer, and a member selected from the group consisting of zinc dibutyl-dithiocarbamate and 1,3,5-trimethyl-2,4,6-tris-(3,5-di-tert.-butyl-4-hydroxy-benzyl)-benzene at a ratio of about 0.1 to 3.0 parts by weight per 100 parts by weight of said elastomer.

2. A solution according to claim 1 in which said blockcopolymer type is styrene-butadiene block-copolymer.

* * * * *